United States Patent
Gangadharan et al.

(10) Patent No.: US 8,266,326 B2
(45) Date of Patent: Sep. 11, 2012

(54) FRAMEWORKS FOR INTEGRATING INFORMATION SYSTEMS

(75) Inventors: Binod P. Gangadharan, Triuandon (IN); Sai Surya Kiran Evani, Vijayawada (IN); Amit Handa, Chandigarh (IN)

(73) Assignee: Oracle America, Inc., Redwood City, CA (US)

( * ) Notice: Subject to any disclaimer, the term of this patent is extended or adjusted under 35 U.S.C. 154(b) by 1892 days.

(21) Appl. No.: 10/663,472

(22) Filed: Sep. 15, 2003

(65) Prior Publication Data

US 2005/0060169 A1    Mar. 17, 2005

(51) Int. Cl.
G06F 15/16    (2006.01)
(52) U.S. Cl. .......................... 709/250; 719/328
(58) Field of Classification Search .................. 709/228, 709/230, 250, 220, 249; 719/319, 320, 328
See application file for complete search history.

(56) References Cited

U.S. PATENT DOCUMENTS

| | | | | |
|---|---|---|---|---|
| 6,088,754 A * | 7/2000 | Chapman | ....................... | 710/305 |
| 6,118,777 A * | 9/2000 | Sylvain | ........................ | 370/351 |
| 6,411,956 B1 * | 6/2002 | Ng | ................... | 707/10 |
| 6,901,440 B1 * | 5/2005 | Bimm et al. | .................. | 709/223 |
| 6,968,553 B1 * | 11/2005 | Theeten | ........................ | 719/311 |
| 6,978,319 B1 * | 12/2005 | Rostoker et al. | .............. | 709/250 |
| 6,993,585 B1 * | 1/2006 | Starkovich et al. | ........... | 709/228 |
| 7,058,950 B2 * | 6/2006 | Jeyaraman | ..................... | 718/104 |
| 7,072,934 B2 * | 7/2006 | Helgeson et al. | ............. | 709/203 |
| 7,076,570 B2 * | 7/2006 | Ahrens et al. | ...................... | 710/6 |
| 7,318,148 B2 * | 1/2008 | Scheibli | ........................... | 713/1 |
| 7,457,845 B2 * | 11/2008 | Fan et al. | ....................... | 709/213 |
| 7,549,124 B2 * | 6/2009 | DeLuca et al. | ................. | 715/736 |
| 2003/0014552 A1 * | 1/2003 | Vaitheeswaran et al. | ..... | 709/312 |
| 2003/0045236 A1 * | 3/2003 | Chang et al. | ..................... | 455/41 |
| 2003/0088362 A1 * | 5/2003 | Melero et al. | .................... | 702/2 |
| 2004/0025171 A1 * | 2/2004 | Barinov et al. | ............... | 719/318 |
| 2008/0263653 A1 * | 10/2008 | Lee et al. | ......................... | 726/10 |
| 2008/0320496 A1 * | 12/2008 | Barinov et al. | ............... | 719/318 |

* cited by examiner

Primary Examiner — David Lazaro
Assistant Examiner — Marie Georges Henry
(74) Attorney, Agent, or Firm — Polsinelli Shughart, PC (57) ABSTRACT

Techniques for integrating Information Systems with Application Servers are disclosed. The techniques can be used to implement a configurable connector interface that connects to existing interfaces used to access various Information Systems. The configurable connection interface can encapsulate these existing interfaces. Accordingly, the configurable connector interface can serve as a standard interface that can be used to connect an application server to various Information Systems. The configurable connection interface can be implemented as a "Resource Adaptor" that can be modified to fit the requirements of a particular existing interface used to access a particular information system (e.g., a database driver developed for a particular relational database). A Graphical User Interface (GUI) can be used to conveniently modify and deploy the modified Resource Adaptor file. These operations can conveniently be performed by using a deployment tool through a Graphical User Interface (GUI).

11 Claims, 5 Drawing Sheets

FRAMEWORKS FOR INTEGRATING INFORMATION SYSTEMS

BACKGROUND OF THE INVENTION

The present invention relates generally to information systems, and more particularly, to techniques for integrating various information systems with application servers and application components that they serve.

As more businesses move towards an electronic business (e-business) strategy, integration with existing Enterprise Information Systems (EIS) becomes more important. This means that Businesses with successful e-business strategy need to integrate their existing Enterprise Information Systems with more recently developed applications (e.g., web-based applications). They also need to extend the reach of their existing Enterprise Information Systems to support business-to-business (B2B) transactions.

To achieve these objectives, extensive efforts have recently been made by a number of entities to integrate existing Enterprise Information Systems (EIS) with electronic business (e-business) strategies. One recent development has resulted in the introduction and use of the Java Programming language. Java computing environment provides a platform independent environment that is suitable for integrating various operating system and/or hardware environment. Conventional approaches, however, do not provide a desirable framework for integrating various Enterprise Information Systems that can be adapted. As a result, Enterprise Information Systems vendors and Application Server vendors use non-standard vendor-specific architectures to provide connectivity between application servers and Enterprise Information Systems. This means that an application server may have to interact with various interfaces implemented for different Enterprise Information Systems.

By way of example, an application server typically needs to access an existing database driver in order to access a particular database. Typically, a database driver has been developed for a particular database. This means that database drivers may vary widely form one implementation to another implementation. Moreover, the way an application server should interact with a database driver can vary from implementation to implementation. In other words, the interface between the application server and the database driver is not defined.

As a result, connecting an application server to an information system typically requires a significant amount of time and resources. Similarly, connecting the application server to another database may require more resources and time, and so forth. This approach, however, cannot be used cost effectively to integrate existing Enterprise Information Systems with more recently developed applications (e.g., web-based applications)

Accordingly, techniques for integrating existing Enterprise Information Systems with Application Servers are needed.

SUMMARY OF THE INVENTION

Broadly speaking, the invention relates to techniques for integrating Information Systems with Application Servers. The techniques can be used to implement a configurable connector interface that connects to various existing interfaces used to access various Information Systems. As will be appreciated, the configurable connection interface can encapsulate these existing interfaces. Accordingly, the configurable connector interface can serve as a standard interface that can be used to connect an application server to various Information Systems. In addition, the configurable connection interface can server as an interface for the application component. The application component can use the configurable connection interface to request connections to the Information System. As will be appreciated, the connection that is established can be a connection that is managed by the Application Server.

In accordance with one aspect of the invention, the configurable connection interface is implemented as a "Resource Adaptor". In one embodiment, the Resource Adaptor is packaged as a Generic Resource Adaptor Archive (GRAR) file that is compliant with a Java DataBase Connection (JDBC) architecture. In any case, the Generic Resource Adaptor Archive (GRAR) file can be modified to fit the requirements of a an existing interface used to access a particular information system (e.g., a database driver developed for a particular relational database). This can, for example, be achieved by adding the existing interface and modifying a set of properties to generate a Customized Resource Adaptor Archive (CRAR). As will be appreciated, a Graphical User Interface (GUI) can be used to conveniently modify and then deploy the modified Resource Adaptor file. These operations can conveniently be performed by using a deployment tool through a Graphical User Interface (GUI).

The invention can be implemented in numerous ways, including a system, an apparatus, a method or a computer readable medium. Several embodiments of the invention are discussed below.

As a method for connecting an application server to an information system which has a first interface, one embodiment of the invention includes the acts of: providing a generic connector interface; receiving information related to the information system, generating a customized connector interface by modifying the generic connector interface based on the received information, and connecting said information system to said application server via said customized connector. It should be noted that the customized connector provides access to the information system through the first interface of the information system.

As a method for connecting an application component to an information systems via an application server operating in a component-based computing environment, one embodiment of the invention includes that acts of: making a first connection request the includes an application component connection reference, by the application component, for a connection to the information system; receiving the first connection request by a second interface that can provide connection to the information system through the first interface; passing the first connection request, by the resource adaptor, to the application server; making a second connection request that includes an application server connection reference, by said application sever, to generate a connection to the information system; generating a connection based on the application server reference; and connecting the application component to the information system via the connection.

Another embodiment of the invention can be implemented as a connection interface in a component based computing environment. The connection interface is capable of operating to connect the application server to a first information system via a first interface that can be used to access the first information system. In addition, the connection interface is capable of operating to encapsulate the first interface, thereby allowing the application server to establish a connection that connects the application component to the first information system.

As a method of connecting an application server to an information system, yet another embodiment of the invention includes the acts of: providing a Generic Resource Adaptor Archive (GRAR) file that can be configured to use a first interface to access the first information system; opening the Generic Resource Adaptor Archive (GRAR) file; adding the interface to the Generic Resource Adaptor Archive (GRAR) file; receiving one or more properties associated with the information system; modifying the Generic Resource Adaptor Archive (GRAR) file, based on the one or more properties, to generate a Customized Resource Adaptor Archive (CRAR) file; and using the Customized Resource Adaptor Archive (CRAR) file to connect the application server to the first information system.

As a computer readable medium including computer program code for connecting an application server to an information system, one embodiment of the invention includes the acts of: computer program code for providing a generic connector interface; computer program code for receiving information related to the information system; computer program code for generating a customized connector interface by modifying the generic connector interface based on the received information; and computer program code for connecting the information system to the application server via the customized connector. Again, it should be noted that the customized connector provides access to the information system through the first interface of the information system.

These and other aspects and advantages of the present invention will become more apparent when the detailed description below is read in conjunction with the accompanying drawings.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION OF THE INVENTION

As described in the background section, conventional approaches do not provide a suitable framework for integrating various existing Information Systems (IS). This makes it difficult to take advantage of more recently developed applications (e.g., newly web-based applications) that are typically provided by application servers. To provide services to application components, application servers need to interact with Information Systems. Accessing an existing Information System, however, typically requires accessing a particular interface that is specifically developed for that Information System (e.g., accessing a database driver developed for a relational database). In other words, the way the application server interacts with the existing interfaces is not defined as a standard.

As a result, a significant amount of time and/or resources is required to connect an application server with various information systems via interfaces that may vary widely form one implementation to another implementation. This approach is highly undesirable for integrating existing Enterprise Information Systems with more recently developed applications (e.g., web-based applications). Accordingly, techniques for integrating existing Enterprise Information Systems with application server are needed.

To achieve this and other objects of the invention, techniques for integrating Information Systems with Application Servers are disclosed. The techniques can be used to implement a configurable connector interface that connects to various interfaces used to access various Information Systems. As will be appreciated, the configurable connection interface can encapsulate existing interfaces of various Information Systems. Accordingly, the configurable connector interface can serve as a standard interface that can be used to connect an application server to various Information Systems. In addition, the configurable connection interface can server as an interface for the application component. The application component can use the configurable connection interface to request connections to the Information System. As will be appreciated, the connection that is established can be a connection that is managed by the Application Server.

In accordance with one aspect of the invention, the configurable connection interface is implemented as a "Resource Adaptor". In one embodiment, the Resource Adaptor is packaged as a Generic Resource Adaptor Archive (GRAR) file that is compliant with a Java DataBase Connection (JDBC) architecture. In any case, the Generic Resource Adaptor Archive (GRAR) file can be modified to fit the requirements of a particular existing interface used to access a particular information system (e.g., a database driver developed for a particular relational database). This can, for example, be achieved by adding the existing interface and modifying a set of properties to generate a Customized Resource Adaptor Archive (CRAR). As will be appreciated, a Graphical User Interface (GUI) can be used to conveniently modify and deploy the modified Resource Adaptor file. These operations can conveniently be performed by using a deployment tool through a Graphical User Interface (GUI).

Embodiments of the invention are discussed below with reference to FIGS. 1-5. However, those skilled in the art will readily appreciate that the detailed description given herein with respect to these figures is for explanatory purposes only as the invention extends beyond these limited embodiments.

Figure 1:
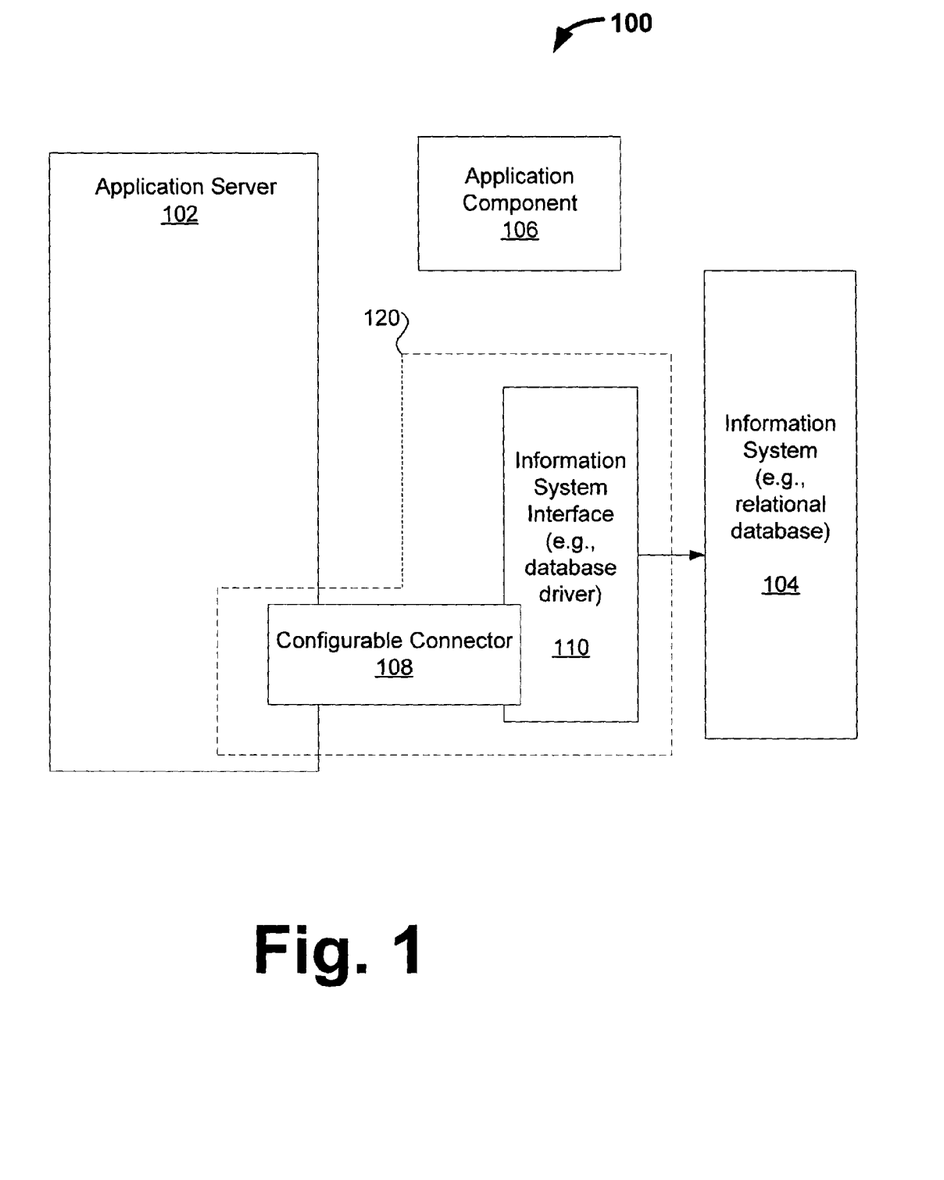
FIG. 1 illustrates a computing environment in accordance with one embodiment of the invention.

FIG. 100 illustrates a computing environment 100 in accordance with one embodiment of the invention. The computing environment 100 includes an application server 102, an information system 104, and an application component 104. The application server 102, among other things, can provide the application component 106 with access to the information system 106. The information system 104 can, for example, be a relational database (e.g., Java Data Base Connection (JDBC) compliant relational database). As such, the services provided by the application server 102 can, for example, include accessing data stored on a relational database data.

It should be noted that application server 102 can be container-based. By way of example, the application server 102 can be implemented as a Java 2 platform, Enterprise Edition (J2EE) server that provides containers for client applications, web components, or Enterprise JavaBeans (EJB) components. These containers provide deployment and runtime support for application components. They can also provide a federated view of services provided by the application server 102 for the application component 106.

As will be appreciated, the computing environment 100 also includes a configurable connector 108 that is configured to access the information system 104 through an interface 110. By way of example, the interface 110 can be a database driver that has been developed for a particular relational database. In any case, the configurable connector 108 can serve as an interface (or connector) between the application server 102 and interface 106. In other words, the interface 110 can be encapsulated to effectively provide a "resource adaptor" 120 that can be used to "plug in" the Application Server 102 to the Information System 104.

It should be noted that the configurable connector 108 can be configured to access another information system (not shown) via another interface (not shown) that has been developed for that particular information system. Thus, the configurable connector 108 can be used to implement a Resource Adaptor that can be plugged into various information systems through various interfaces.

By way of example, In J2EE environments, the configurable connector 108 can be implemented as a "JDBC Connector." In other words, it can be a J2EE Connector Architecture compliant connector that facilitates integration of Information Systems with J2EE application servers. As such, the JDBC Connector makes it easy to plug any driver based on JDBC technology ("JDBC driver") into any J2EE compliant application server.

In other words, The JDBC Connector can form a "glue" layer between a JDBC driver and an application server. This benefits both the JDBC driver vendors and application server vendors. The JDBC driver vendors can use the JDBC Connector to package their JDBC drivers as connectors (or resource adapters), thus enabling "plug-and-play" with J2EE application servers. J2EE application server vendors can use JDBC Connector to allow pluggability of any third-party JDBC drivers into their products.

Figure 2:
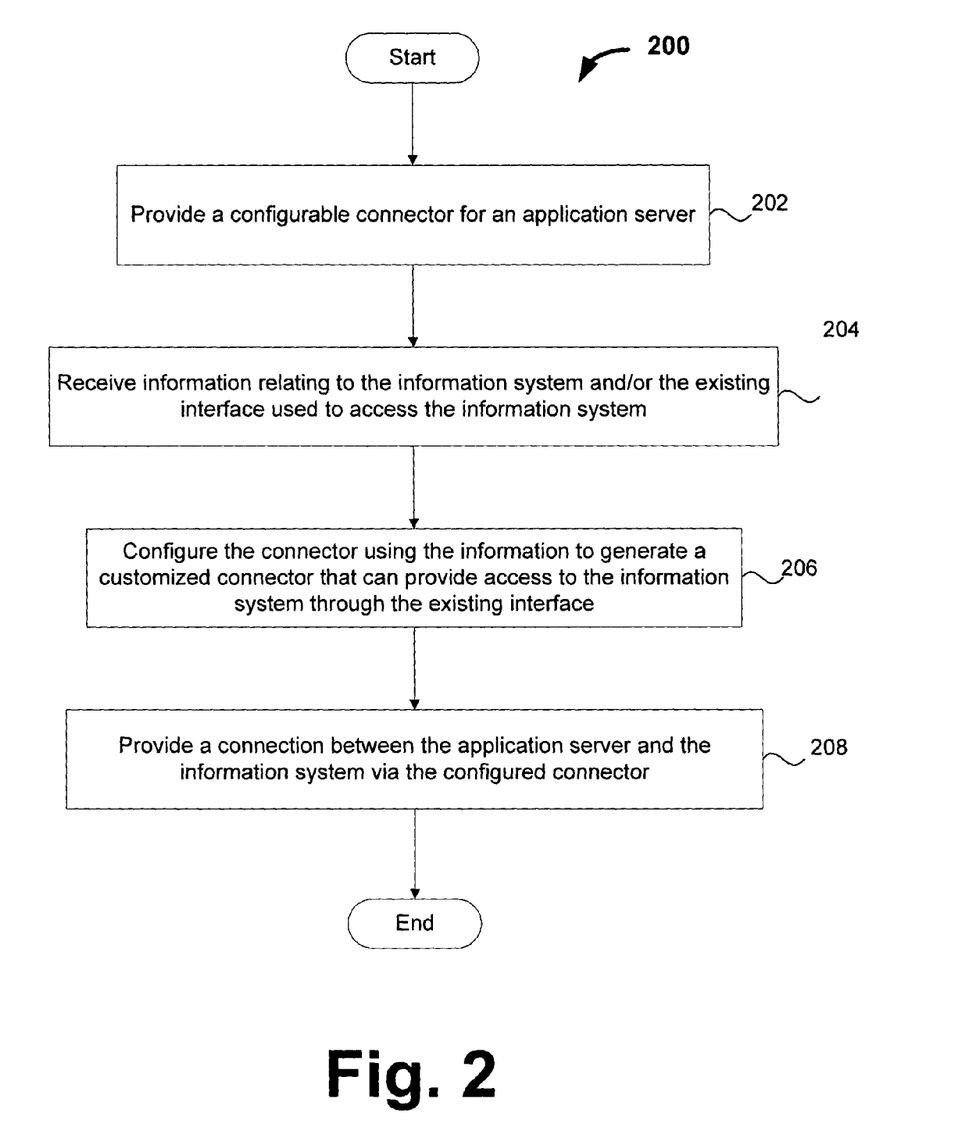
FIG. 2 illustrates a method for connecting an application server to an information system in accordance with one embodiment of the invention

FIG. 2 illustrates a method 200 for connecting an Application Server to an information system in accordance with one embodiment of the invention. Method 200 can, for example, be used to connect the application server 102 to the Information System 104 of FIG. 1. Information System 104 can be, for example, a relational database (e.g., a JDBC compliant database implemented in a Java programming environment). It should be noted that the information system is accessed through an existing interface (e.g., interface 110 shown in FIG. 1). This interface can, for example, be a database driver that is specifically developed to access a particular database.

Initially, at operation 202, a configurable connector is provided for the Application Server. Next, at operation 204, information related to the information system and/or the existing interface used to access the information system is received. Thereafter, the method 200 proceeds to operation 206 where the connector is configured, using the information, to generate a customized connecter. As will be appreciated, the customized connector allows the application server to access the Information System through the existing interface. Accordingly, at operation 208, the configured connector provides a connection between the Application Server and the Information System via the existing interface.

Figure 3:
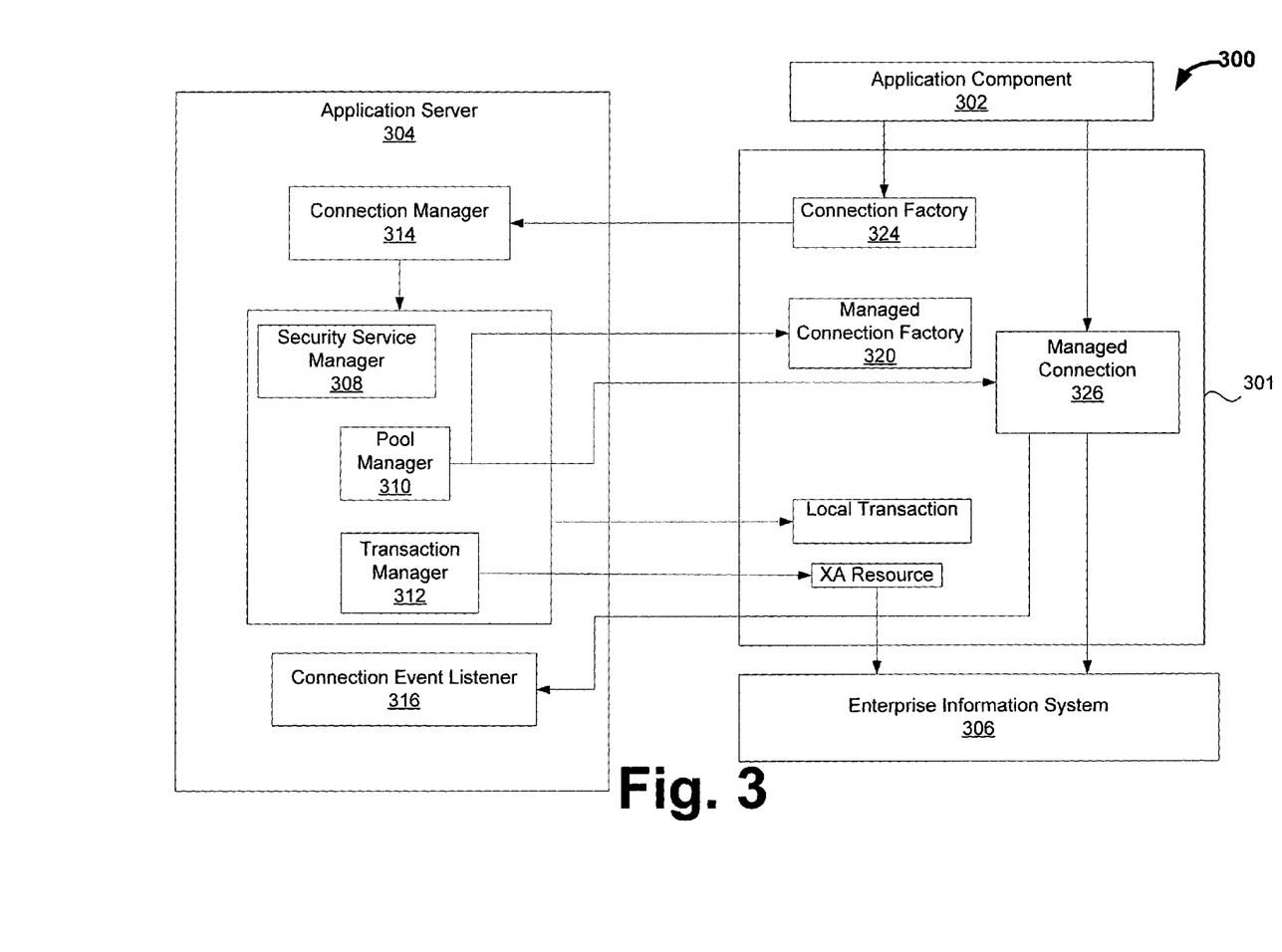
FIG. 3 depicts a Java computing environment including a resource adaptor in accordance with one embodiment of the invention.

As noted above, a configurable connector can effectively provide a resource adaptor that can be plugged to various Information Systems. The resource adaptor can effectively encapsulate an existing interface that is used to access a particular database. To further illustrate, FIG. 3 depicts a Java computing environment 300 including a resource adaptor 301 in accordance with one embodiment of the invention. Java computing environment 300 also includes an application component 302, an application server 304, and an Enterprise Information System 306. The resource adaptor 301 provides a connection between the application server 304 and an Enterprise Information System 306. The application component 302 can use the services provided by the application server 304. These services can, for example, include security, pool management, and transaction services respectively provided by a security service manager 308, a pool manager 310, and a transaction manager 312. The application server 304 also includes a connection manager 314 and a connection event listener 316 which respectively operate to manage connections and listen for events related to connections established between the application component 302 and the Enterprise Information System 306.

As shown in FIG. 3, the resource adaptor 301 includes a managed connection factory 320. The connection factory 320 can, among other things, generate a connection factory 324 and manage a managed connection 326 that is established between the application component 302 and the Enterprise Information System 306. The operations performed by these components will be further illustrated below.

Figure 4:
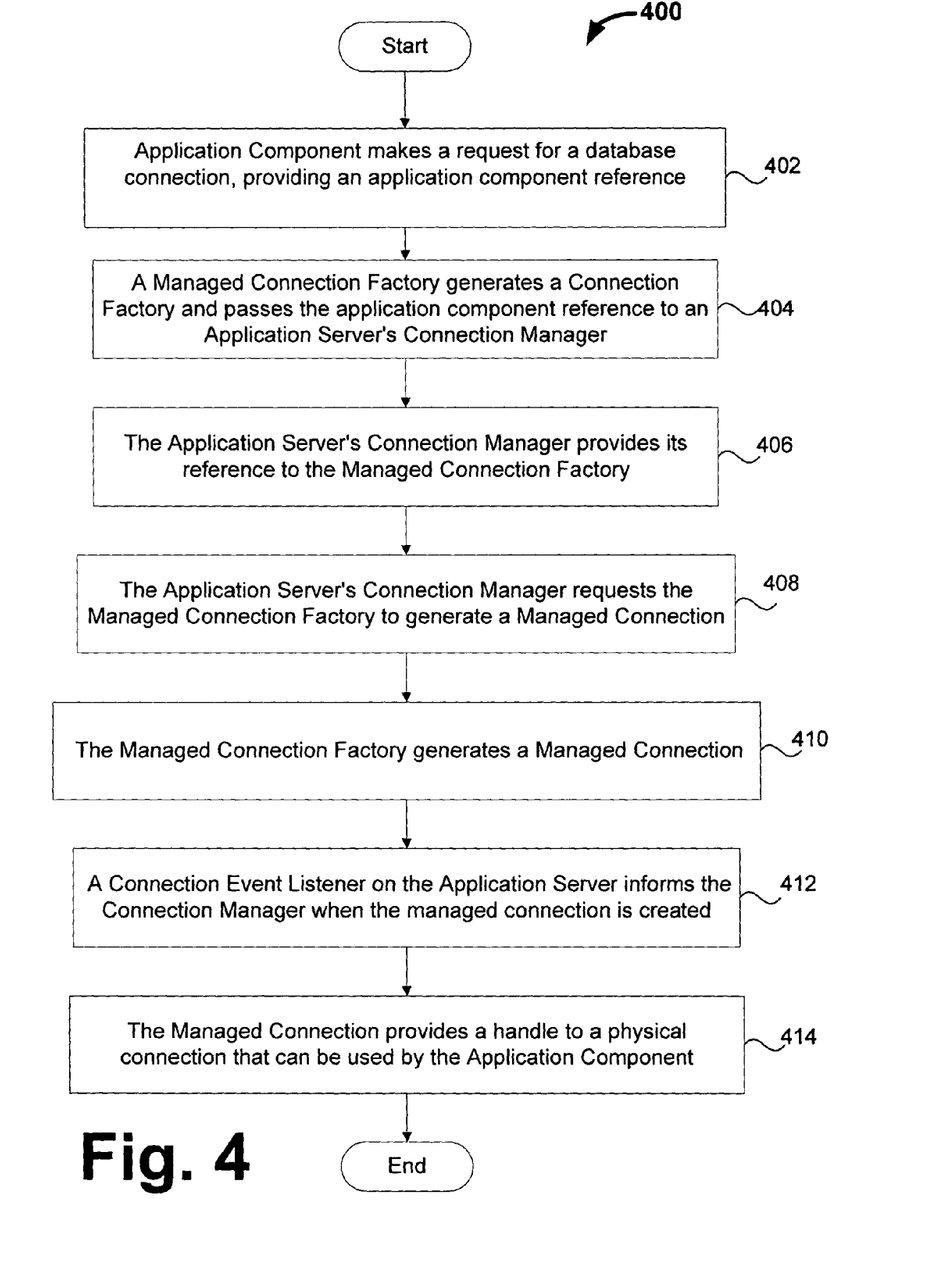
FIG. 4 illustrates a connection method for providing an application component with a connection to an information system in accordance with one embodiment of the invention.

FIG. 4 illustrates a connection method 400 for providing an application component with a connection to an Information System in accordance with one embodiment of the invention. As will be appreciated this connection is provided by implementing a resource adaptor (e.g., resource adaptor 301 of FIG. 3) which encapsulates an existing interface to the Information system. The connection method 400 can, for example, be used to provide the application component 302 with a connection to the Enterprise Information System 306 of FIG. 3. It should be noted that an Application Server (e.g., Application Server 304) provides the application component with services related to the Enterprise Information System. As such, the connection to the Information System can be managed by the Application Server.

Initially, at operation 402, an application component makes a request for a database connection. This request typically includes an application component reference. Accordingly, at operation 404, in response to this request, a managed connection factory (e.g., managed connection factory 320 of FIG. 3) generates a connection factory (e.g., connection factory 324 of FIG. 3). In addition, the managed connection factory passes the application component reference to a connection manager operating on the Application Server (e.g., connection manager 314 of FIG. 3).

Next, at operation 406, the connection manager of the Application Server provides its own reference to the managed connection factory. Thereafter, the connection method 400 proceeds to operation 408 where the Application Server's Connection Manager requests that the managed connection factory generate a managed connection (e.g., managed connection 326). Accordingly, at operation 410, the managed connection factory generates a managed Connection.

When the managed connection is generated, at operation 412, a connection event listener of the Application Server (e.g., connection event listener 316) informs the connection manager that the Managed Connection has been generated. Finally, at operation 414, the managed connection provides a handle to a physical connection. As will be appreciated, this physical connection can be used by the application component as a connection to the Information System. The connection method 400 ends following operation 414.

As noted above, the invention provides a resource adaptor that effectively encapsulates an interface to an information system. By way of example, the resource adaptor can be provided as a Resource Adaptor Archive (RAR) file. As will be appreciated, the Resource Adaptor Archive (RAR) file can be conveniently modified and used for various configurations.

Figure 5:
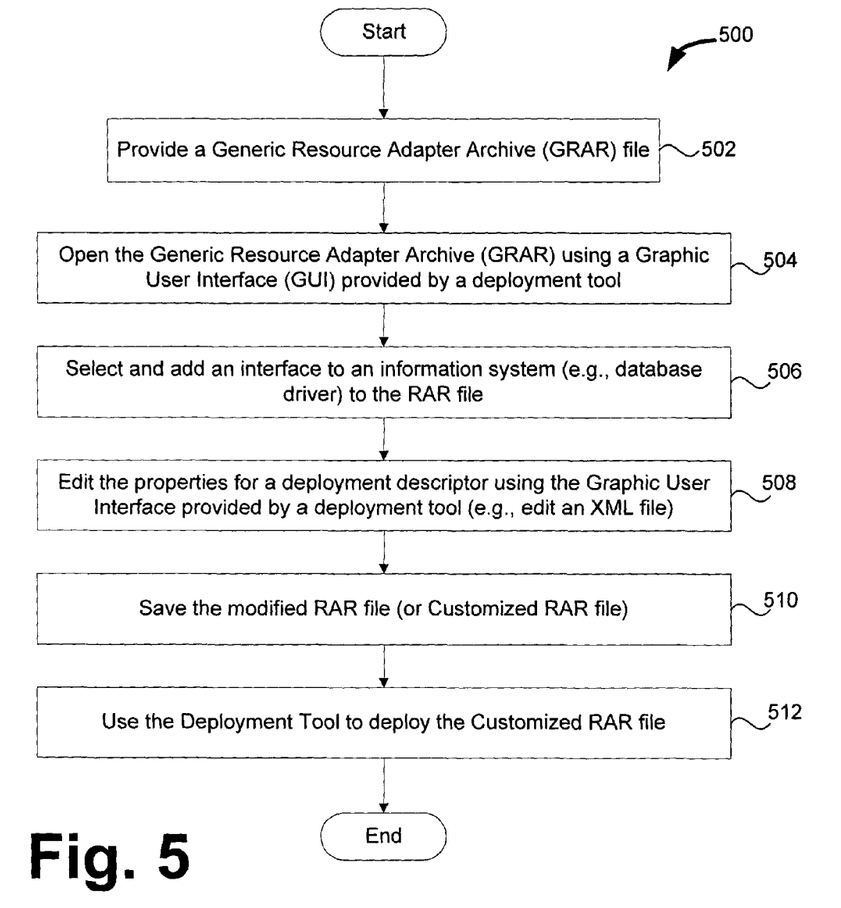
FIG. 5 illustrates a method for configuring a resource adaptor using a Resource Adaptor Archive (RAR) file in accordance with one embodiment of the invention.

To elaborate further, FIG. 5 illustrates a method 500 for configuring a resource adaptor using a Resource Adaptor Archive (RAR) file in accordance with one embodiment of the invention.

Initially, at operation 502, a Generic Resource Adapter Archive (RAR) file is provided. As will be appreciated, the Generic Resource Adapter Archive (GRAR) file can be adapted to various interfaces used to access various Information Systems. Next, at operation 504, the Generic Resource Adapter Archive (GRAR) file is opened. The Generic Resource Adapter Archive (GRAR) file can be opened using a deployment tool. As will be appreciated by those skilled in the art, a deployment tool, among other things, can be used to perform various functions associated with deploying applications and providing run time support for various components of a component-based Java computing environment. The deployment tool can conveniently be accessed through a Graphic User Interface (GUI). Thus, the deployment tool provides an easy way to access the Resource Adapter Archive (GRAR) file.

Accordingly, at operation 506, the Graphic User Interface (GUI) can be used to select and add an existing interface of the information system (e.g., a database driver) to the Generic Resource Adapter Archive (GRAR) file. Thereafter, at operation 508, the Graphic User Interface (GUI) can be used to edit the properties typically associated with the interface to the information system and/or the information system. This can be achieved by editing a deployment descriptor that can, for example, be implemented as an Extensible Markup Language (XML) file. These properties can, for example, include one or more of the following parameters: a server name, a port number, a user name, a password, a database name, a data source name, a description, a network protocol, a role name, a login timeout, driver properties, a delimiter, and a class name.

It should be noted that after modification performed at operations 506 and 508 a Customized (or configured) Resource Adapter Archive file (CRAR) is generated. Accordingly, at operation 510, the modified Generic Resource Adapter (or Customized Resource Adapter Archive file (CRAR)) is saved. Finally, at operation 512, the Customized Resource Adapter Archive (CRAR) file can be deployed. Again, a Graphic User Interface can be used to initiate deployment of the Customized Resource Adapter Archive file. The method 500 ends following operation 512.

It should be noted that a JDBC Connector can be implemented for J2EE environments in accordance with one embodiment of the invention. Initially, a Resource Adapter Archive (RAR) file that matches the transactional abilities of a driver can be opened. Then, JDBC driver classes can be added. A few configuration properties can be set and saved. Then the saved RAR file can be deploy into the application server. While deploying, Java Naming and Directory Interface (JNDI) names of the JDBC resource references for a particular J2EE application can be linked to the DataSource objects in the JDBC Connector. Thereafter, standard JDBC API can be used.

Accordingly, J2EE applications can run without modification because with the JDBC Connector, J2EE Applications don't need to know or care whether the JDBC driver is packaged as a connector or not. As will be appreciated by those skilled in the art, Appendix A includes a summary of exemplary packages that can be implemented for a Java II Enterprise Edition system (J2EE) in accordance with one embodiment of the invention. To illustrate further, Appendix B lists various components of an exemplary "Javax.resource.spi" package. The "Javax.resource.spi" package can be implemented in accordance with a Service Provider Interface (SPI) architecture. As such, the "Javax.resource.spi" package includes the Application Program Interfaces (APIs) for system contracts that can be defined between a Resource Adaptor and an Application Server. Similarly, Appendix C lists various components of an exemplary "Javax.resource.cci" package. The "Javax.resource.cci" package can be implemented in accordance with a Common Client Interface (CCI) architecture that defines a standard client application programming Interface for application components. The Common Client Interface (CCI) enables application components and Enterprise Application Integration (EAI) frameworks to drive interactions across heterogeneous Enterprise Information System using a common client API. As will be appreciated by those skilled in the art, the invention can be implemented without changing the way that clients request connections and/or Application Servers serve client requests.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention.

What is claimed:

1. A method of connecting an application server to an information system, said method comprising:

providing, utilizing an application server executing on at least one processor, a generic connector interface on said application server, the generic connector interface comprising a Generic Resource Adaptor Archive (GRAR) file;

receiving information related to an information system at said application server, said information system having a first interface, said information system accessible utilizing said first interface;

generating, utilizing said application server, a customized connector interface on said application server, by modifying one or more properties of said generic connector interface, using said received information by:

adding said first interface to the Generic Resource Adaptor Archive (GRAR) file, and creating a Customized Resource Adaptor Archive (CRAR) file by modifying a deployment descriptor of the Generic Resource Adaptor Archive (GRAR) file; and connecting, utilizing said application server, said information system to said application server via said customized connector interface utilizing the Customized Resource Adaptor Archive (CRAR) file by encapsulating said first interface by a second interface that is implemented after said generic connector interface is customized, wherein said customized connector interface provides access to said information system through said first interface of said information system.

2. The method as recited in claim 1, wherein said providing of a generic connector interface comprises providing a software package.

3. The method as recited in claim 2, wherein said information system is a relational database that is compliant with a Java DataBase Connection (JDBC) architecture.

4. The method as recited in claim 1, wherein modifying the deployment descriptor comprises editing at least one of a server Name, a port number, a user name, a password, a database name, a data source name, a description, a network protocol, a role name, a login timeout, driver properties, a delimiter, or a class name.

5. The method as recited in claim 1, wherein said receiving of information related to said information system comprises: receiving one or more parameters.

6. The method as recited in claim 5, wherein said receiving of information related to said information system further comprises receiving said one or more parameters as input through a Graphical User Interface (GUI).

7. The method as recited in claim 1, wherein said connecting of said information system to said application server comprises:
encapsulating said first interface by a second interface that is implemented after said generic connector interface is customized.

8. The method as recited in claim 1, wherein generating a customized connector interface comprises:
generating a second interface that can encapsulate the first interface.

9. A non-transitory computer readable medium including computer program code for connecting an application server to an information system, said computer readable medium comprising:
computer program code, stored in at least one computer readable medium and executable by at least one processing unit, for providing a generic connector interface, the generic connector interface Comprising a Generic Resource Adapter Archive (GRAR) file;
computer program code, stored in the at least one computer readable medium and executable by the at least one processing unit, for receiving information related to an information system, said information system having a first interface, said information system accessible utilizing said first interface;
computer program code, stored in the at least one computer readable medium and executable by the at least one processing unit, for generating a customized connector interface, by modifying one or more properties of said generic connector interface, using based on said received information by:
adding said first interface to the Generic Resource Adaptor Archive (GRAR) file, and
creating a Customized Resource Adaptor Archive (CRAR) file by modifying a deployment descriptor of the Generic Resource Adaptor Archive (GRAR) file; and
computer program code, stored in the at least one computer readable medium and executable by the at least one processing unit, for connecting said information system to said application server via said customized connector interface utilizing the Customized Resource Adaptor Archive (CRAR) file by encapsulating said first interface by a second interface that is implemented after said generic connector interface is customized, wherein said customized connector interface provides access to said information system through said first interface of said information system.

10. The computer readable medium as recited in claim 9, wherein said computer programming code, stored in at least one computer readable medium and executable by at least one processing unit, for providing a generic connector interface comprises:
providing a software package.

11. The computer readable medium as recited in claim 10, wherein said information system is a relational database is compliant with a Java DataBase Connection (JDBC) architecture.

\* \* \* \* \*